(12) United States Patent
Brand

(10) Patent No.: US 12,129,062 B2
(45) Date of Patent: Oct. 29, 2024

(54) PACKAGING MACHINE WITH A GROUPING DEVICE AND METHOD FOR PRODUCING SINGLE-LAYER GROUPS OF PARTIALLY OVERLAPPING PRODUCTS

(71) Applicant: GERHARD SCHUBERT GMBH, Crailsheim (DE)

(72) Inventor: Sebastian Brand, Satteldorf (DE)

(73) Assignee: Gerhard Schubert GmbH, Crailsheim (DE)

( * ) Notice: Subject to any disclaimer, the term of this patent is extended or adjusted under 35 U.S.C. 154(b) by 0 days.

(21) Appl. No.: 17/869,694

(22) Filed: Jul. 20, 2022

(65) Prior Publication Data

US 2023/0331417 A1     Oct. 19, 2023

(30) Foreign Application Priority Data

Apr. 14, 2022   (DE) .......................... 102022109282.8

(51) Int. Cl.
  *B65B 35/40*   (2006.01)
  *B65B 5/06*    (2006.01)
  (Continued)

(52) U.S. Cl.
  CPC .............. *B65B 35/405* (2013.01); *B65B 5/06* (2013.01); *B65B 35/36* (2013.01); *B65B 35/56* (2013.01);
  (Continued)

(58) Field of Classification Search
  CPC ....... B65B 35/36; B65B 35/405; B65B 35/56; B65B 5/06; B65G 2201/0214; B65G 47/248; B65G 47/907
  See application file for complete search history.

(56) References Cited

U.S. PATENT DOCUMENTS 465,875 A    12/1891  McCoy
3,209,923 A * 10/1965  Bargel .................... B65B 21/20
                                              53/247

(Continued)

FOREIGN PATENT DOCUMENTS

DE    101 29 226 A1    1/2003
EP    2 133 271 A1    12/2009
(Continued)

OTHER PUBLICATIONS

German Examination Report (with English Machine Translation) Dated Jan. 12, 2023, Application No. 10 2022 109 282.8, 12 Pages.
(Continued)

*Primary Examiner* — Thomas M Wittenschlaeger
*Assistant Examiner* — Himchan Song
(74) *Attorney, Agent, or Firm* — Brooks Kushman P.C.

(57) ABSTRACT

A packaging machine may include a grouping device comprising a spreading area with a spreading table having a base body and a plurality of support bars adjustable in their transverse spacing, each having at least one row of seats extending in a longitudinal direction, each for one product. The grouping device may also include at least one transverse drive for adjusting the transverse spacing, for producing a single-layer group having an even or uneven number of rows of products, and for inserting the group into an outer package. The plurality of support bars include a plurality of double-row support bars which cannot be moved relative to one another in the transverse direction, and at least two single-row support bars that are movable relative to one another in the transverse direction positioned between two of the double-row support bars.

18 Claims, 10 Drawing Sheets

(51) Int. Cl.
*B65B 35/36* (2006.01)
*B65B 35/56* (2006.01)
*B65G 47/248* (2006.01)
*B65G 47/26* (2006.01)
*B65G 47/90* (2006.01)

(52) U.S. Cl.
CPC ......... *B65G 47/248* (2013.01); *B65G 47/261* (2013.01); *B65G 47/907* (2013.01); *B65G 2201/0214* (2013.01)

(56) References Cited

U.S. PATENT DOCUMENTS

| | | | |
|---|---|---|---|
| 3,253,694 A | | 5/1966 | Kinney |
| 3,788,463 A | | 1/1974 | Ruff |
| 4,411,574 A | | 10/1983 | Riley |
| 4,435,941 A | | 3/1984 | Booth et al. |
| 4,658,575 A | * | 4/1987 | Lousberg ............ D01H 9/02 57/274 |
| 4,686,813 A | | 8/1987 | Sawada |
| 4,771,589 A | | 9/1988 | Mueller et al. |
| 5,147,177 A | | 9/1992 | Kikuchi et al. |
| 5,641,051 A | | 6/1997 | Bergmann |
| 5,704,195 A | | 1/1998 | Benz |
| 5,829,222 A | | 11/1998 | Schlagel et al. |
| 5,983,603 A | | 11/1999 | Lee et al. |
| 7,409,812 B2 | * | 8/2008 | Gilmore ............ B65G 57/04 53/473 |
| 8,522,954 B2 | | 9/2013 | Haehnel et al. |
| 10,399,796 B2 | | 9/2019 | Bellante |
| 2010/0051417 A1 | * | 3/2010 | Spindler ............ B65G 47/682 198/444 |
| 2012/0233967 A1 | * | 9/2012 | Bellante ............ B65D 85/8043 53/539 |

FOREIGN PATENT DOCUMENTS

| | | |
|---|---|---|
| EP | 2 500 151 B1 | 11/2014 |
| EP | 2 853 357 B1 | 5/2018 |
| WO | 2011/016968 A1 | 2/2011 |
| WO | 2015075571 A1 | 5/2015 |

OTHER PUBLICATIONS

European Opposition Dated Feb. 4, 2019, Application No. 14191300. 4, Publication No. EP 2 853 357 B1, "Machine and method for cartoning articles", Applicant Cama1 S.p.A., 30 Pages.
European Written Decision of the Opposition Dated Jun. 23, 2022, Application No. / Patent No. 14191300.4-1014 / 2853357, Applicant Cama1 S.p.A, 99 Pages.
Niederschrift über die Bewisaufnahme durch Einvernahme von Zeugen, aufgenommen in der mündlichen Verhandlung vor der Einspruchsabteilung am Feb. 8-10, 2022—europäisches Patent EP2 853 357 (Patentanmeldung Nr. 14 191 300) (with English Machine Translation) Minutes of the taking of evidence by examination of witnesses, taken at the oral proceedings before the Opposition Division on Feb. 8. 10, 2022—European patent EP2 853 357 (patent application No. 14 191 300), 72 Pages.
E9.1a—affidavit Kleinert concerning Dryers (with English Machine Translation) dated Feb. 4, 2019, 14 Pages.
E9.1b—affidavit Lichtenfeld concerning Dreyers (with English Machine Translation) dated Feb. 4, 2019, 14 Pages.
E9.2a—Parts List, 1 Page.
E9.2b—Drawing spreading table slide (with English Machine Translation), 2 Pages.
E9.2c—Drawing spreading table base frame (with English Machine Translation), 2 Pages.
E9.3—Assembly report (with English Machine Translation), 2 Pages.
E9.4—Total machine image display (with English Machine Translation), 2 Pages.
E9.5a-b—Machine with slide in different positions, 2 Pages.
E9.6—Basic rack with slide in various positions, 1 Page.
E9.b—Drawing (with English Machine Translation), 2 Pages; E9.b—Drawing is also included on p. 2 of references E9.1a and E9.1b.
E10.1a—Weißbeck affidavit concerning Keurig (with English Machine Translation) Dated Feb. 4, 2019, 10 Pages.
E10.1b—affidavit Brand concerning Keurig (with English Machine Translation) Dated Feb. 4, 2019, 10 Pages.
E10.1c—affidavit Fohrer concerning Keurig (with English Machine Translation) Dated Feb. 4, 2019, 10 Pages.
E10.2a—Total invoice with delivery date, Schubert Packaging Automation, Inc., Invoice No. 10051710, 2 Pages.
E10.2b—Partial invoice concerning last partial amount—Schubert Packaging Automation, Inc., Invoice No. 10051810, 1 Page.
E10.3—Service report concerning installation and commissioning of the machine at Keurig Inc. in USA, Schubert, Date of visit Jan. 22-Feb. 25, 2011, Machine No./Type MA004098, 2 Pages.
E10.4—Service report concerning rework, Schubert, Date of visit Mar. 21-25, 2011, Machine No./Type MA004098, 1 Page.
E10.5a-b—Drawing and picture representation total machine (with English Machine Translation), 5 Pages.
E10.6a-e—Parts list, drawings and pictorial representations of the conveyor system of the machine (with English Machine Translation), 8 Pages.
E10.7a-c—Parts list, drawing and image representation Format set = Clipboard (with English Machine Translations), 6 Pages.
E10.8a-d—Parts list, drawing and pictorial representations Slide = "Spreading Station" (with English Machine Translation), 7 Pages.
E10.9a-g—Parts list, drawing and illustrations "Filling machine" (with English Machine Translation), 12 Pages.
E10.10a-e—Parts list, Drawing and Image representations "Translation tool" (with English Machine Translation), 8 Pages.
E10.11a-g—Parts list, Drawing and Image representations "Translation machine" (with English Machine Translation), 12 Pages.
E10.12a-f—(Indicated as E10.12a-d on p. 13 of Opposition)—Parts list, Drawing and Image representations "Fill Tool" (with English Machine Translation), 11 Pages.
E11—Affidait by Mr. Lichtenfled (with English Machine Translation) Dated Apr. 5, 2019, 3 Pages.
E12—Affidavit by Mr. Weissbeck (with English Machine Translation), dated Apr. 5, 2019, 4 Pages.
European Search Report re EP App. No. 23154678.9-1014 dated Oct. 17, 2023; Applicant: Gerhard Schubert GmbH (with English machine translation) (10 pages).

* cited by examiner

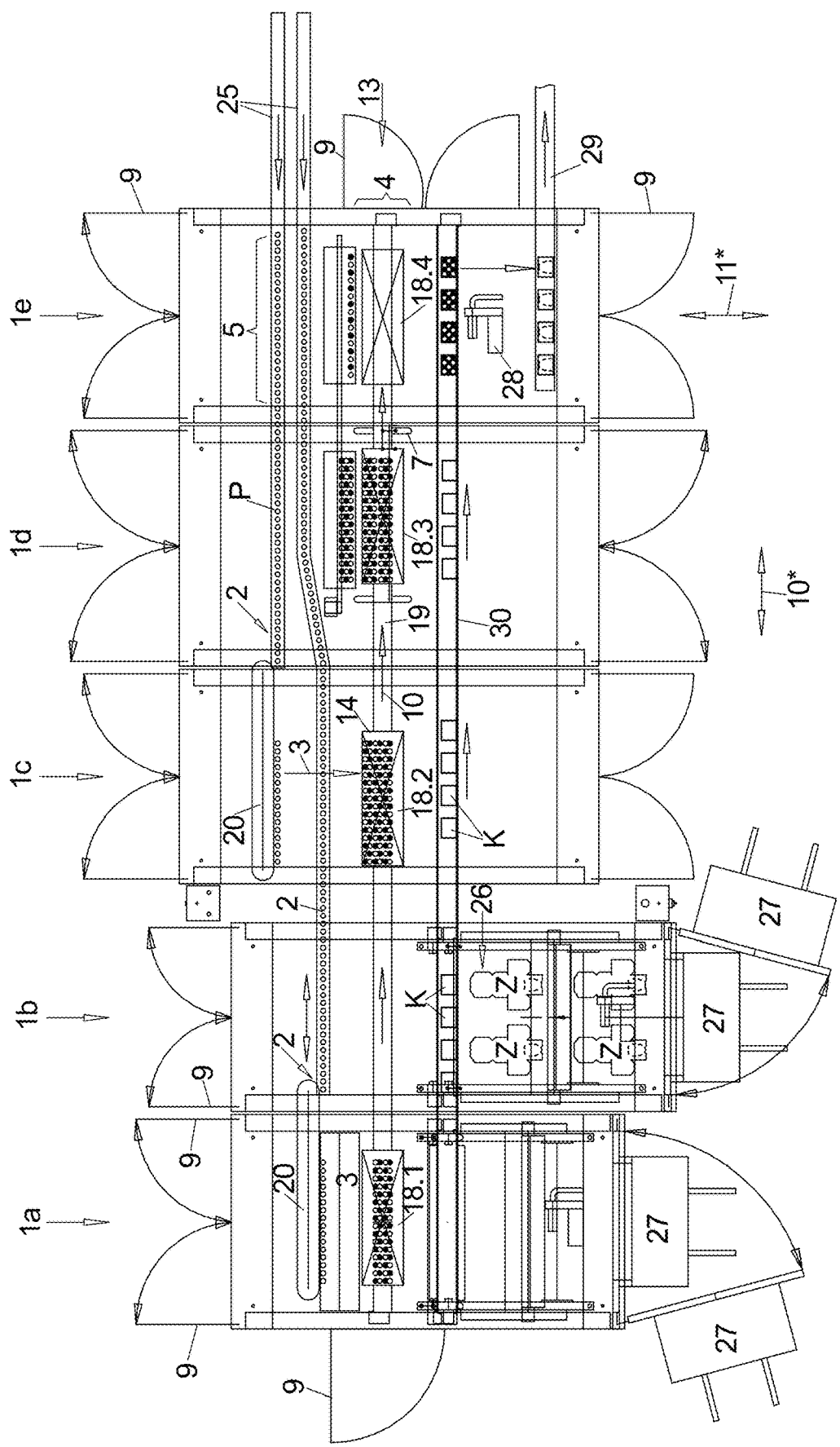

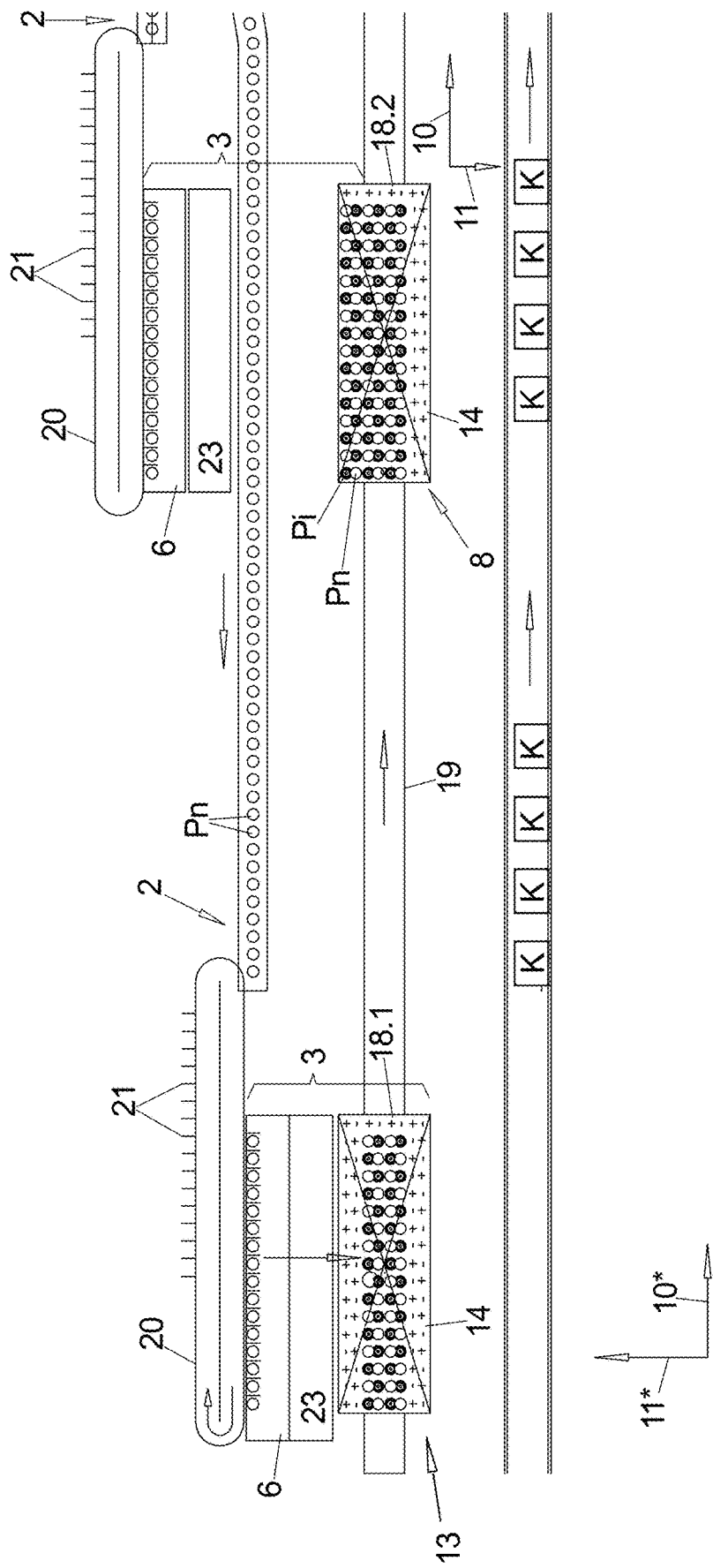

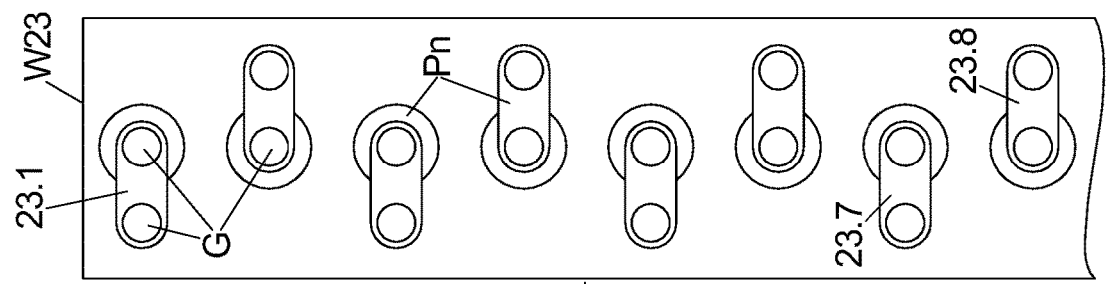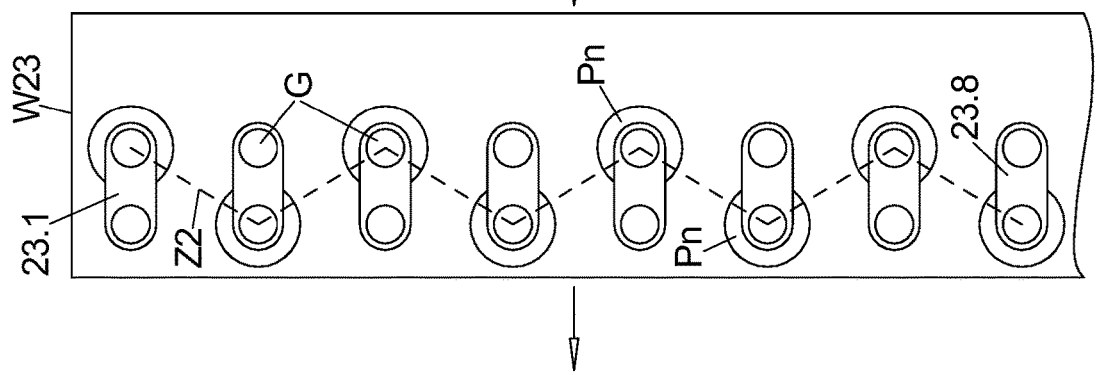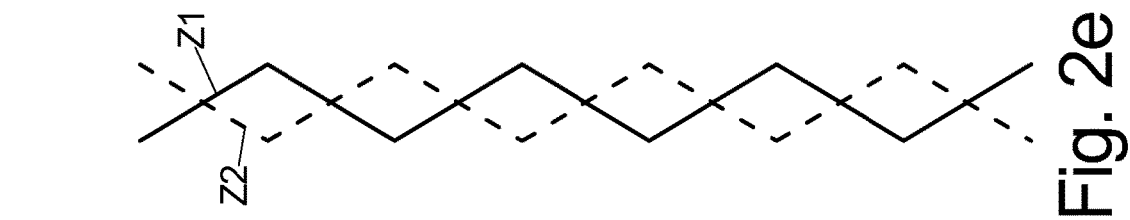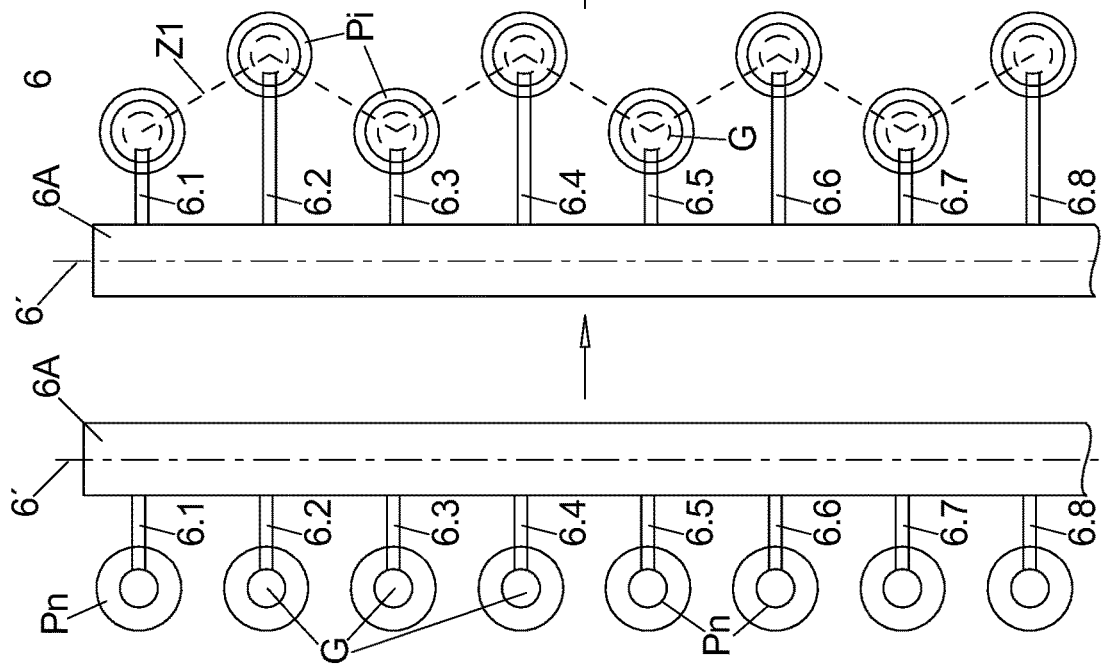

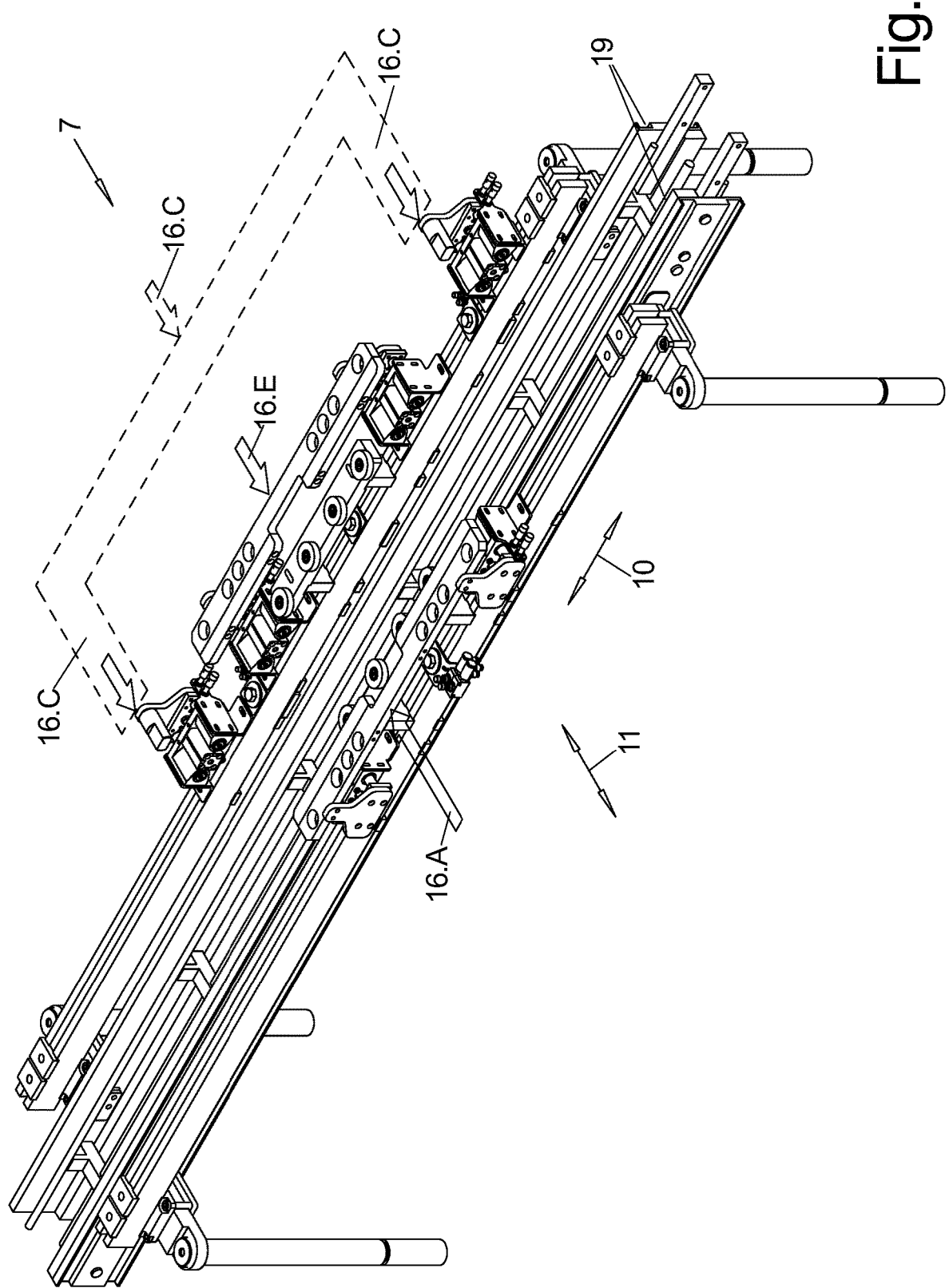

PACKAGING MACHINE WITH A GROUPING DEVICE AND METHOD FOR PRODUCING SINGLE-LAYER GROUPS OF PARTIALLY OVERLAPPING PRODUCTS

CROSS-REFERENCE TO RELATED APPLICATIONS

This application claims foreign priority benefits under 35 U.S.C. § 119(a)-(d) to German patent application number DE 102022109282.8, filed Apr. 14, 2022, which is incorporated by reference in its entirety.

TECHNICAL FIELD

The disclosure relates to a grouping device and a method for producing single-layer products in which the products partially overlap each other within the layer, for example in longitudinal and transverse directions.

BACKGROUND

Such groups are required in particular in packaging machines, because products often have to be placed in a certain group arrangement in an outer packaging such as boxes or cartons.

Irrespective of this, the task is to keep the effort for forming the groups as low as possible, e.g., to keep the number of drives for this purpose low or to keep the number of robots or other handling devices for the products as low as possible—whereby in the following, in the context of the application, robots are to include all other types of handling devices.

This applies in particular to the tool attached to a robot, which has to be moved by the robot and should therefore be as compact as possible and, above all, as light as possible in order to make acceleration from a standstill and deceleration to a standstill as fast as possible.

Such grouping and the corresponding grouping device become more complicated if the group consists not only of products standing next to each other in a single layer, but also, for example, of products of different orientation in order to achieve the highest possible packing density in the outer package.

In particular, products which are not cylindrical or cuboid in shape, but which taper in one spatial direction, from wine bottles to ice cream cones to truncated cone-shaped coffee capsules, can be packed more densely in this way, for example in a single-layer, two-dimensional group of coffee capsules, by alternately arranging a normal coffee capsule and an upside-down coffee capsule in the longitudinal and transverse directions, i.e., in the rows and columns.

The situation is even more difficult if such products with different orientation in the group are also to be grouped—e.g., viewed from above—partially overlapping each other in order to achieve an even higher pairing density.

In this context, both spreading tables and spreading tools on a robot are already known in principle, each of which has support elements, usually support bars, along which there are several grippers, such as suckers, for holding one product each, whereby the mutual spacing, in the case of support bars the transverse spacing of the support bars lying parallel to one another, can be varied. While in the case of a spreading table the number of drives increases the complexity, but the resulting increase in weight is of secondary importance, such an increase in weight is very disadvantageous in the case of a robot tool because of the resulting reduction in the working speed of the robot.

In this context, it is also known to distribute the grouping movements for forming the desired group to a spreading table on one side and a robot tool on the other.

In general, a feeding robot transfers a feeding set of products from a delivery area, where the products are delivered in one or more rows, to the spreading table, and from there, by means of a spreading robot, removes and deposits them, often directly in an outer packaging such as a box or a carton, the tool of one or both of the robots can be a spreading tool.

By spreading it should be understood that not only the transverse distance between the product carriers or grippers can also be actively widened from an initial state, but also the reverse case, that the initial state is the spaced functional position and at a spreading station the product carriers or gripper carriers are approached towards each other.

If the products are all delivered in the same orientation, i.e., standing on their feet, the grouping device must also include a flipper that turns at least some of the products to an upside-down orientation.

SUMMARY

It is therefore an object according to the disclosure to provide a packaging machine with a grouping device as well as an operating method therefor, in which above all the grouping device is constructed to be as simple and functionally reliable as possible and enables rapid operation of the grouping device, in particular of the entire packaging machine, in particular due to the lowest possible weight of the robot tool on one of the transfer robots.

A packaging machine of the type is intended for producing a multi-row, single-layer group of products, in particular on a spreading table, the products within the group partially overlapping one another in the transverse direction, as seen from above, and for inserting the group or parts of the group, the discharge sets, which consist in particular in the longitudinal direction of several so-called carton arrays for one carton each, into an outer package, for example a carton.

In the following, for the sake of simplicity, we will refer only to cartons, which—also in the preceding text—is intended to include all types of outer package.

Lateral overlapping serves to increase the density of the package and is particularly useful when the products do not have a uniform cross-section along their height, as in the case of coffee capsules, for example, which can be easily overlapped laterally in particular when adjacent coffee capsules are alternately upside down or on their feet, as soon as the wide rim on one side is located once at the top and once at the bottom.

As is known, the packaging machine can comprise a grouping device with
- at least one spreading table with a base body and a plurality of support bars, adjustable in their transverse spacing, each having at least one longitudinal direction row of seats for one product each,
- at least one transverse drive for adjusting the transverse spacing.

The approximately horizontal support bars are usually located on the upper side of the base body of the spreading table, and the transverse direction in which the transverse distance is present and can be adjusted preferably extends at right angles to the longitudinal direction.

Such spreading tables are variously known to adjust the distance of the rows of seats from a feeding distance, in which it corresponds in particular to the row distance of the rows of grippers of a loading feeding robot, to a discharge distance, which corresponds in particular to the row distance of the rows of grippers of a discharge robot unloading in particular the spreading table.

This so-called spreading, i.e., changing the transverse spacing of the rows of seats and thus of the support bars in which they are arranged—can alternatively also be provided in the tool of a transfer robot, then a so-called spreading tool, but this then makes the robot tool heavy and complicated, which contradicts the aim of a tool on the robot that is as light as possible and easy to accelerate, so that at least part of the manipulations to be carried out on the products during transfer are outsourced to a spreading table.

The seats, each of which can accommodate one product, are usually formed as recesses in the support bars.

Apart from the grouping device, the packaging machine usually further comprises:
  a delivery area, in which the products are delivered in one or more rows
  a feeding area with a feeding robot for transferring a feeding set of products from the delivery area to the spreading table,
  a discharge area with a discharge robot for transferring a discharge set of products away from the spreading table directly or indirectly into the outer package.

In terms of the number of products and/or number of rows and/or number of products per row, the group does not necessarily have to match the feed set and/or the discharge set, but it can match them. The same applies to the comparison between the infeed set and the outfeed set. Likewise, the group does not necessarily have to match the spreading table in terms of number of products and/or number of rows and/or number of products per row, but can match it.

For example, the group to be produced, which is assembled in particular on the spreading table, may comprise 6 rows of 16 products each.

A feed set, on the other hand, can comprise 2 rows of 16 products each, so that 3 feed sets are placed, usually one after the other in time, on the spreading table, for example, in order to make the group to be produced available there.

A discharge set, on the other hand, can comprise 3 rows of 16 products each, with which, for example, four cartons with 3 rows of 4 products each are filled simultaneously.

Particularly in the case of cartons filled with several layers, it can happen that, in order to achieve the contents of the carton specified for marketing reasons, the top layer has, for example, only 3 rows of 3 products each. In this case, the top layer in the carton would be a set with 3 rows of 12 products each.

The excess products on the spreading table occupied by 6 rows of 16 products each would be parked in a buffer, e.g., on a buffer slide, but would be further used.

A robot is understood to be any type of handling device. For example, a robot may have a base and a robot-arm having one end movably attached to the base, and another end carrying any kind of a tool. Furthermore, such a robot may have one or more drives for moving the robot-arm and for moving or operating the tool.

The feed set of products is usually also a single-row or double-row group of products, but need not be identical to the group to be produced in terms of number of products and number of rows and arrangement of products.

In the longitudinal direction along the rows of seats, these preferably have the same longitudinal spacing from one another over all, i.e., in all support bars of the spreading table and in the case of several spreading tables in all spreading tables.

However, it is possible for the discharge robot to change this longitudinal spacing during transfer, i.e., it is a spreading tool that can spread in the longitudinal direction.

According to the disclosure, the packaging machine, in particular its grouping device, in particular its spreading table, comprises:
  several support bars comprising two or more rows, each with at least two rows of seats for one product each, and between them at least two support bars which can be moved relative to one another in the transverse direction which have only one row of seats.

A double-row support bar is understood to mean one or more support bars in which the rows of seats arranged thereon are not movable relative to one another in the transverse direction. It is irrelevant whether these rows of seats, which are not movable relative to one another, are arranged on a common support bar or are distributed over two separate support bars which are not movable relative to one another in the transverse direction.

In particular, the two single-row support bars are adjacent to each other in the transverse direction, which means that there is no other support bar or row of seats between them.

The spreading table drive is designed to be able to selectively move the two single-row support bars toward or away from each other in the transverse direction, in particular between a feed distance and a discharge distance.

Regardless of the type of group to be formed on the spreading table, the feeding distance is generally always the same, since it depends on the row distance of the usually always identical feeding robot used.

However, there can be several versions of the discharge distance depending on the shape of the group to be produced and in particular on the desired row distance between the individual rows, especially within a discharge set:

If, for example, 2-row discharge sets are to be arranged, the discharge distance within the discharge set usually corresponds to the row distance of the rows within the double-row support bars, and then the distance between the single-row bars is also set to the same row distance of the seats, which is usually the initial state anyway, and thus the feed distance between the two single-row support bars, which is then also the discharge distance.

If, for example, 3-row discharge sets are to be produced, in which the row spacing within this discharge set is generally to be the same as in the 2-row discharge sets and as the row spacing on the double-row support bars, then the discharge spacing between the two rows of single-row support bars is selected in such a way that each of them is connected to the respective adjacent support bar, the distance between the two rows of single-row support bars is selected so that each of them is brought close to the adjacent double-row support bar, in particular to the point of contact, so that the distance between one row on the single-row support bar and the next row on the double-row support bar is the same as between the two rows of the double-row support bar.

For example, if 4-row discharge sets are to be produced, both single-row support bars are positioned relative to one of the adjacent double-row support bars in the transverse direction so that the distance between all 4 rows of the discharge set is the same, namely the same as between the two rows of the double-row support bar involved.

If there are then two more double-row support bars on the opposite side of the single-row support bars, these are also brought closer together so that there is the same transverse spacing between the two middle rows of seats as between the two rows of each of the two double-row support bars, which is the same for both.

In this way, it is possible to create discharge sets with both an odd and an even number of rows, although the maximum number of rows that can be achieved must of course be matched to the number and alternating arrangement in the transverse direction of single-row and double-row support bars.

Structure of Spreading Table in General:

Preferably, at least two of the support bars of a spreading table are fixed (=transverse fixed) to the base body in transverse direction, but not directly adjacent to each other. The remaining support bars are

- either each, in particular all, of them can be displaced transversely directly relative to the base body, in particular independently of one another, and are then referred to below as direct bars
- or at least one of the non-transverse fixed support bars can be displaced transversely as a direct bar directly relative to the base body, and
- the remaining support bars as non-transverse fixed support bars are only indirectly displaceable relative to the base body by being transversely displaceable directly relative to the direct bar, and are hereinafter referred to as indirect bars.

Preferably, the indirect bars are the outermost support bars of the spreading table.

In particular, if at least one, or preferably two, guide rods, which are spaced apart in the longitudinal direction and are positioned parallel to one another, which extend in the transverse direction from the at least one direct bar on at least one side, in particular both sides, along which the at least one indirect bar is positively guided, this results in a simple structure that can be implemented with only a few drives for transverse adjustment of the support bars.

1. Concrete Solution:

One solution can consist of

- a double-row support bar which is arranged directly adjacent to one of two single-row support bars in the transverse direction, i.e., without any other support bars between,
- the double-row support bar and the one of the two single-row support bars facing away from it are fixed transversely to the base body, and
- a double-row support bar is arranged on the outside adjacent to each of the two transverse fixed support bars.

Then 2-row, 3-row and 4-row groups, in particular discharge sets, of products can be produced with only 3 transverse drives.

In the initial state, the two single-row support bars will usually be at a very small distance from each other, in particular in contact with each other, but they will have an initial distance from the adjacent double-row support bars, which is preferably the feed distance, and adjacent double-row support bars may also be spaced apart from each other, such as by the initial distance. Then, for the production of 2-row discharge sets, this initial distance is also the discharge distance.

Preferably, the non-transverse fixed single-row support bar is a direct bar, while the two outer double-row support bars are indirect bars.

The non-transverse fixed single-row support bar can be moved in the transverse direction by means of a controlled 1st transverse drive, which can act in particular on the end face of the guide rod and displace it in the transverse direction.

Preferably

- either the two outer double-row support bars can be moved in the transverse direction by means of a separate 2nd and 3rd transverse drive each
- or the two outer double-row support bars can be moved in opposite synchronism in the transverse direction by means of a common 2nd transverse drive and a counter-synchronous mechanism. For example, the counter-synchronous mechanism may be any suitable mechanism, such as linkage assembly or lever assembly, that cooperates with the common 2nd transverse drive to move the two outer double-row support bars toward or away from each other in a counter-synchronous manner.

2. Concrete Solution:

Another concrete solution can be that

- a double-row support bar is arranged directly adjacent to one of two single-row support bars, each of the two single-row support bars independently of the other is transversely displaceable relative to the base body,
- a double-row support bar is arranged transversely fixed to the base body on the outside adjacent to this package on each side of the package, which has 4 rows of seats.

This can also enable a design with very few drives.

In particular, this is the case when, in the initial state, the two single-row support bars are very close to each other or contact each other, but are at an initial distance from the adjacent double-row support bars, and the double-row support bars are spaced apart from each other by an initial distance.

This object is further promoted by the fact that

- the two single-row support bars can be moved in opposite synchronism in the transverse direction by means of a controlled 1st transverse drive and a counter-synchronous mechanism, and
- the double-row support bar on the one hand and the two single-row support bars together on the other hand are movable in transverse direction in counter-synchronism by means of a controlled 2nd transverse drive and a counter-synchronous mechanism.

Product Flipper:

If the products within the group are to be oriented alternately differently in the longitudinal direction and/or in the transverse direction, in particular alternately standing on their feet and standing on their heads, each feeding area should have a product flipper with grippers, in particular suckers, which can be pivoted with products on them about a horizontal pivot axis, in particular together with the base body of the product flipper.

In this way, products can be pivoted from a 1st orientation to a 2nd orientation.

In particular, the number of grippers should correspond to the number of half a feeding set of products for feeding to the spreading table.

In particular, the product flipper should be embodied to be able to shift its grippers, especially suckers between a first functional position with all grippers in only one row and a second functional position in which every 2nd gripper is displaced transversely to this original row into a second, parallel row so that the grippers are now on a zigzag line.

If the feeding robot has a tool with two rows of grippers, in particular suckers, for holding one product each, which on the one hand can pick up the turned products lying on the zigzag line and in addition can pick up the same number of non-turned products lying on a complementary zigzag line, this tool holds two rows of products oriented alternately in both the row direction and the column direction.

This can be achieved in a particularly simple manner by attaching a pair of two grippers adjacent to each other in the transverse direction of the row direction to a pair holder in the tool of the feed robot and by moving these pair holders, which are arranged one behind the other in the longitudinal direction, in the transverse direction between the first functional position, in which the grippers are arranged in 2 rows extending in the longitudinal direction, and the second functional position, in which the grippers are arranged in 3 rows extending in the longitudinal direction.

Several Spreading Tables:

In order to increase the throughput, several movable, in particular independently movable, spreading tables can be present within the machine, while the at least one transverse drive is arranged in one, in particular only one, spreading station to which all loaded spreading tables can be moved.

This means that the entire mechanical system and drives required for spreading only have to be provided once in the machine, even if a large number of spreading tables are in use, since changing the transverse spacing in the spreading station, which is preferably also the discharge area for the discharge sets of the assembled groups, and transferring them from the spreading table to the outer package or to a discharge conveyor is much faster than correctly assembling the load for a spreading table and its loading process.

For this reason, there are existing preferably several delivery areas and feeding areas in the packaging machine, in each of which a spreading table can be loaded completely or only partially, in particular one after the other.

Preferably, each spreading table can be moved by means of a transport device, in particular arranged on a slide which can be moved along a guide, in particular to the spreading station and/or the discharge area with the discharge robot there.

The tool of the discharge robot preferably has several rows of grippers, in particular suckers, arranged at a fixed transverse distance, and the grippers adjacent in the transverse direction, arranged approximately at the same longitudinal position along the rows, are fastened as a transverse group to a transverse group holder, and these transverse group holders can be moved in the longitudinal direction between a first, more widely spaced and the second, more closely spaced or contacting functional position.

In particular, the tool of the discharge robot has two rows for gripping and transferring two-row discharge sets and, accordingly, the transverse-group holders are then pair holders since they hold exactly two grippers.

In this way, before the products are transferred into the outer package, they can be additionally brought to a desired longitudinal distance, preferably as close as possible and overlapping in the longitudinal direction, in order to achieve a high packing density in the outer package.

Depending on the job, it can happen that when the spreading table is emptied, a residual group remains on the spreading table that no longer corresponds to a carton array. This is especially the case if the cartons are filled in several bearings, but not all bearings should have the same number of products.

In order to empty the spreading table completely, this residual group—whether it is parts of a row extending in longitudinal direction, a whole row or a part or a whole gap of the group on the spreading table—is temporarily stored and used later on.

For this purpose, a buffer for such products is provided, in particular with longitudinal direction rows of seats (S), which are located in particular in transverse direction at an overlapping distance, and are preferably formed on a buffer slide, which is movable back and forth in continuous direction, in particular along a buffer rail.

Preferably, a buffer robot is provided which is able to transfer the rest group into the buffer and to perform further manipulations on the rest group and/or its individual products, e.g., interlocking around an upright axis, changing the distance in longitudinal and/or transverse direction or other manipulations.

The buffer slide can approach the longitudinal position of the spreading station in the passage direction at such a transverse distance from the discharge robot that the latter can remove products from the buffer slide with its tool, in particular in whole carton arrays and, in particular, directly transfer them into cartons.

With regard to the method for producing at least one multi-row, single-layer group of products (P) from products delivered in particular in one or more rows and inserting the group or parts of the group as carton arrays into an outer package, such as a carton (K)

wherein the number of rows can optionally be an even or an odd number, in particular the number of rows can be 2, 3 or 4, wherein the products within the group, viewed in plan view, partially overlap one another in the row direction, the longitudinal direction, and/or in the transverse direction thereto at the latest upon insertion into the outer package, in particular by means of a packaging machine according to one of the preceding claims, it is known that at least one spreading table is provided, on which in each case a plurality of support strips with two rows or only one row of seats for one product per seat are arranged adjustably with respect to one another in their transverse spacing, two single-row support bars being arranged adjacent to one another in the transverse direction between two double-row support bars.

In accordance with the disclosure, the two single-row support bars are then arranged between a closely adjacent, in particular contacting, layer next to one another and a more widely spaced apart and closely adjacent, in particular contacting, position with respect to the adjacent double-row support rail.

whereby in the first case a group with an even number of rows and in the second case a group with an odd number of rows can be created.

Preferably, the products within the group are arranged alternately in different orientations in the longitudinal direction and/or in the transverse direction.

To form 4-row groups, both single-row support bars are preferably brought into close proximity, in particular in contact with a directly adjacent double-row support bar, and on the other side of the two single-row support bars two double-row support bars are brought into a closely adjacent position to each other, but at a distance from the two single-row support bars.

Preferably, the support bars are arranged in such a way that for packages with closely adjacent 2, 3 or 4 rows of seats, the distance between the packages of seats and the support bars carrying them is always the same. This means that the same discharge tool can always be used.

Usually, the products are already fed to the spreading table in 2-row feed sets, where within the feed set, both along the rows and across them, the products are alternately in one of two different orientations, in particular standing on their feet and upside down.

For this purpose in particular, the feed set is generated by
a 1st row of products is gripped corresponding to the number of a half feed set with products present in a 1st orientation,
the 2nd and each other even-numbered product of the row is displaced in transverse direction into a parallel row, so that the products are arranged in a zig-zag pattern, in particular lying on a zig-zag line,
all these products are flipped, in particular together, into a 2nd orientation,
another row of products is gripped corresponding to the number of a half-feed set with products present in a 1st orientation,
from this other turned row, the 1st and each other unturned product is moved in transverse direction into a parallel row so that the products are arranged in a complementary zigzag pattern, in particular lying on a complementary zigzag line,
the turned products are held between the unturned products as a feed set.

Whether all odd-numbered products from the turned row are transferred to a parallel row in the transverse direction and the even-numbered products from the other row or vice versa is irrelevant, provided that a double-row feed set is formed in which the products alternate in terms of their orientation in the longitudinal direction as well as in the transverse direction.

If a remaining group of products remains on the spreading table after the carton arrays have been transferred to the cartons, this can be transferred to a buffer, in particular by rotating the residual group about an upright axis.

After reaching a filling level of the buffer—which contains only one layer—that comprises at least one carton array, preferably as many carton arrays as can be obtained from one remaining group, at least one, preferably all, obtainable carton arrays are removed from the buffer and transferred, in particular directly, into cartons and the remaining residual groups of products are further used in this way.

BRIEF DESCRIPTION OF THE DRAWINGS

Embodiments according to the disclosure are described in more detail below by way of example, with reference to the following drawings which show:

FIG. 1: the packaging machine with schematic product flow in plan view;

FIG. 1a: an enlarged section of the left part of FIG. 1 showing the product flow without machine frame;

FIG. 5: the spreading station in perspective view.

DETAILED DESCRIPTION

Figure 1B:
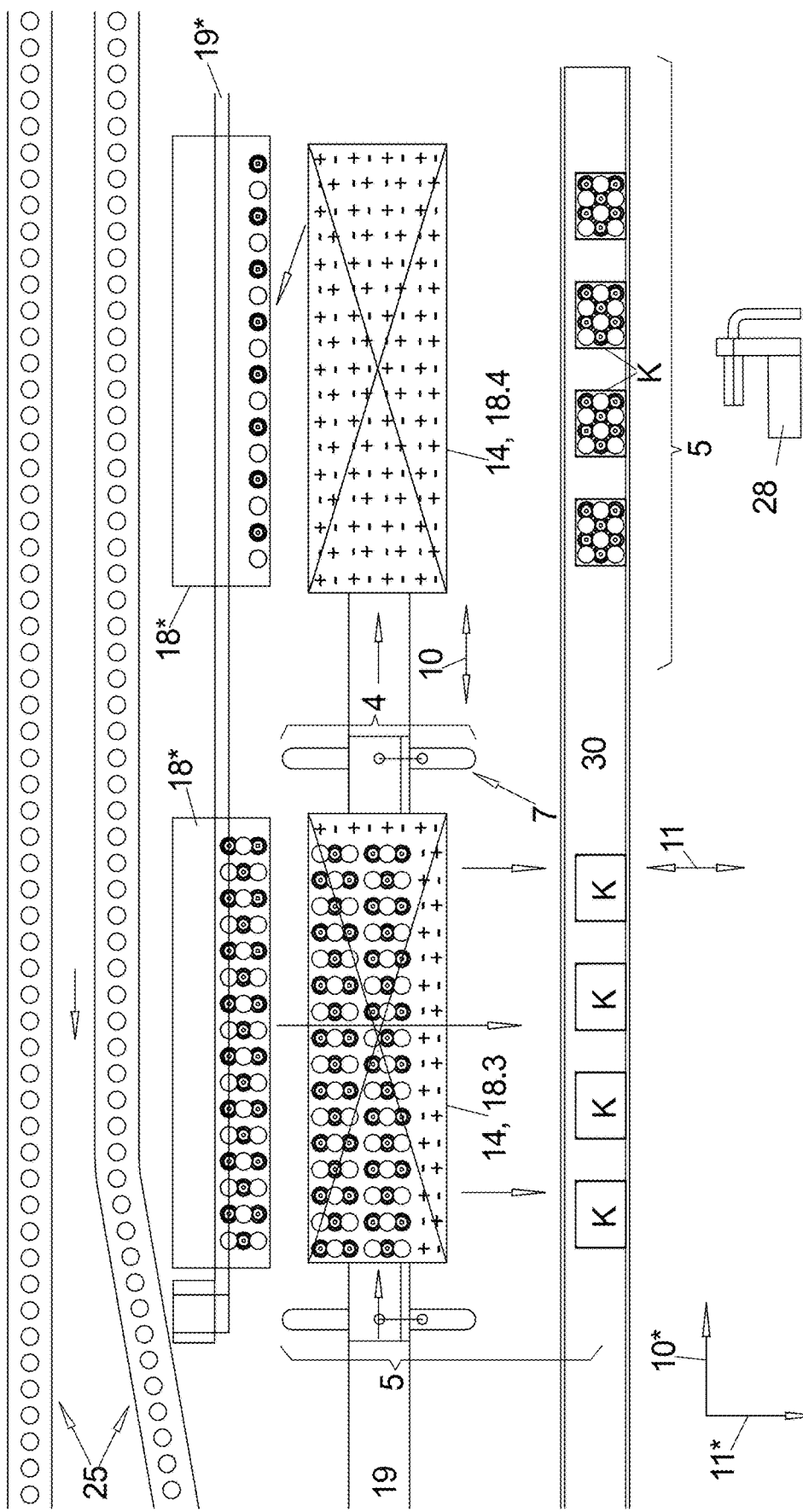
FIG. 1b: an enlarged section of the right part of FIG. 1 showing the product flow without the machine frame.

FIG. 1 and, in enlarged section views, FIGS. 1a, b show the packaging machine in plan view, whereby in FIG. 1, in the upper right, products P are fed in two separate tracks by means of a product feed conveyor 25 in each case and, in the lower right, cartons K filled and closed therewith are discharged from the machine by means of a carton discharge conveyor 29.

In principle, the products P are fed by each of the two product feed conveyors 25 in each case in the main transport direction 10* from right to left to one of two respective delivery areas 2, from there in one respective feeding area 3 in a specific arrangement—the so-called feed sets—onto one slide 18 each 18.1, 18.2, 18.3 of a transport device 8, each of which carries a spreading table 14 as part of a grouping device 13 and, in FIG. 1, is moved on from left to right in the main transport direction 10* and converted into open cartons K in the right-hand end region of the machine.

The packaging machine comprises in the main transport direction 10* several, in this case five, frame modules 1a-1e one behind the other, each of which is rectangular in plan view and the respective longitudinal sides of which are closed by a double-wing safety door 9, and the two end sides of the machine are also closed by a safety door 9, which immediately stops the machine if one of the safety doors 9 is opened.

The two delivery areas 2 and infeed areas 3 are located in the frame modules 1a and 1c.

The cartons K are removed as usual from flat blanks Z, which are taken individually from a blank magazine 27 arranged at the side of the respective frame module 1a, b and which can be folded out for filling, and fed to an erector 26, which erects the blanks Z into three-dimensional cartons. These are then transported further on a container conveyor 30 to discharge area 5—here in frame module 1d—where the products P arranged on a spreading table 14 are discharged from the latter and transferred to the empty cartons K. The discharge area 5 also comprises a spreading table 14.

Figure 4A:
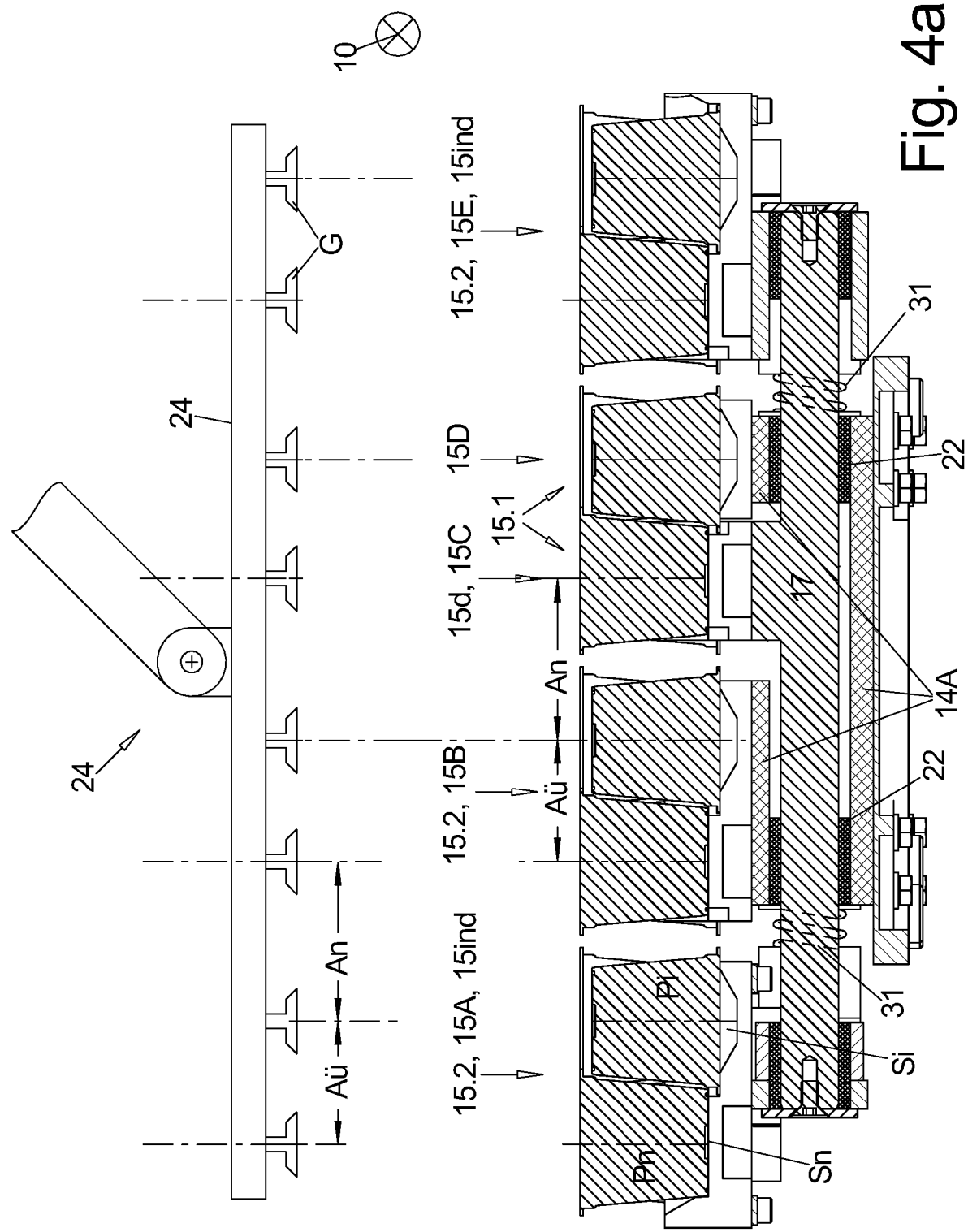
FIG. 4a: the spreading table of FIG. 3 viewed in longitudinal direction with four times each two rows of seats in overlapping position, and distance between the double rows located in overlapping position to each other.

This discharge area 5 also includes a spreading area 4 with a spreading station 7, in order to bring the rows R of products located there on the spreading table 14 and extending in the longitudinal direction 10 to the correct transverse distance from one another, so that the discharge robot 24—shown only in FIG. 4a—can transfer the products to the cartons K.

The filled cartons K are then moved transversely to the main transport direction 10* and closed by means of a closing station 28 by means of their lid, placed on a carton discharge conveyor 29 and thus discharged from the packaging machine in the main transport direction 10*.

In the present case, the longitudinal direction 10 of the spreading tables 14, which is in particular the longitudinal direction 10 of the rows R of seats S thereon, coincides with the main transport direction 10* of the packaging machine, and likewise the horizontal transverse direction 11 of the spreading tables 14, which extends at 90° thereto, coincides with the horizontal transverse direction 11*, which extends at 90° to the main transport direction 10* of the machine.

As FIG. 2a and FIGS. 4a-c show, these are products P which, in order to achieve the greatest possible packing density, can be arranged overlapping in the horizontal plane in the longitudinal direction 10 as well as in the transverse direction 11 and placed in cartons, since they have a cross section which does not remain constant over their height, in particular they are not cylindrical but in this case frusto-conical with a horizontally projecting rim on the broad side of the truncated cone, for example coffee capsules.

If possible, these should be able to be inserted into a carton K by one and the same machine in carton arrays of products P having a different number with regard to longitudinal direction and transverse direction.

If—as shown in FIGS. 1, 1a, 1b—e.g., three rows extending in longitudinal direction 10, each with four such products P, are to be inserted as densely packed as possible, the products must be arranged alternately in normal orientation Pn and inverse orientation Pi from one product P to the next, preferably in both directions of an array oriented in longitudinal direction 10 and transverse direction 11.

For this purpose, these products P are arranged with their conical circumferential surfaces in the central height range so close to one another or in contact with one another that the capsule located with the widened edge at the bottom, i.e., upside down—hereinafter referred to as inversely oriented product Pi in this position, in contrast to a product Pn located in the normal position with the projecting rim at the top—could not be pulled out upwards.

Figure 4B:
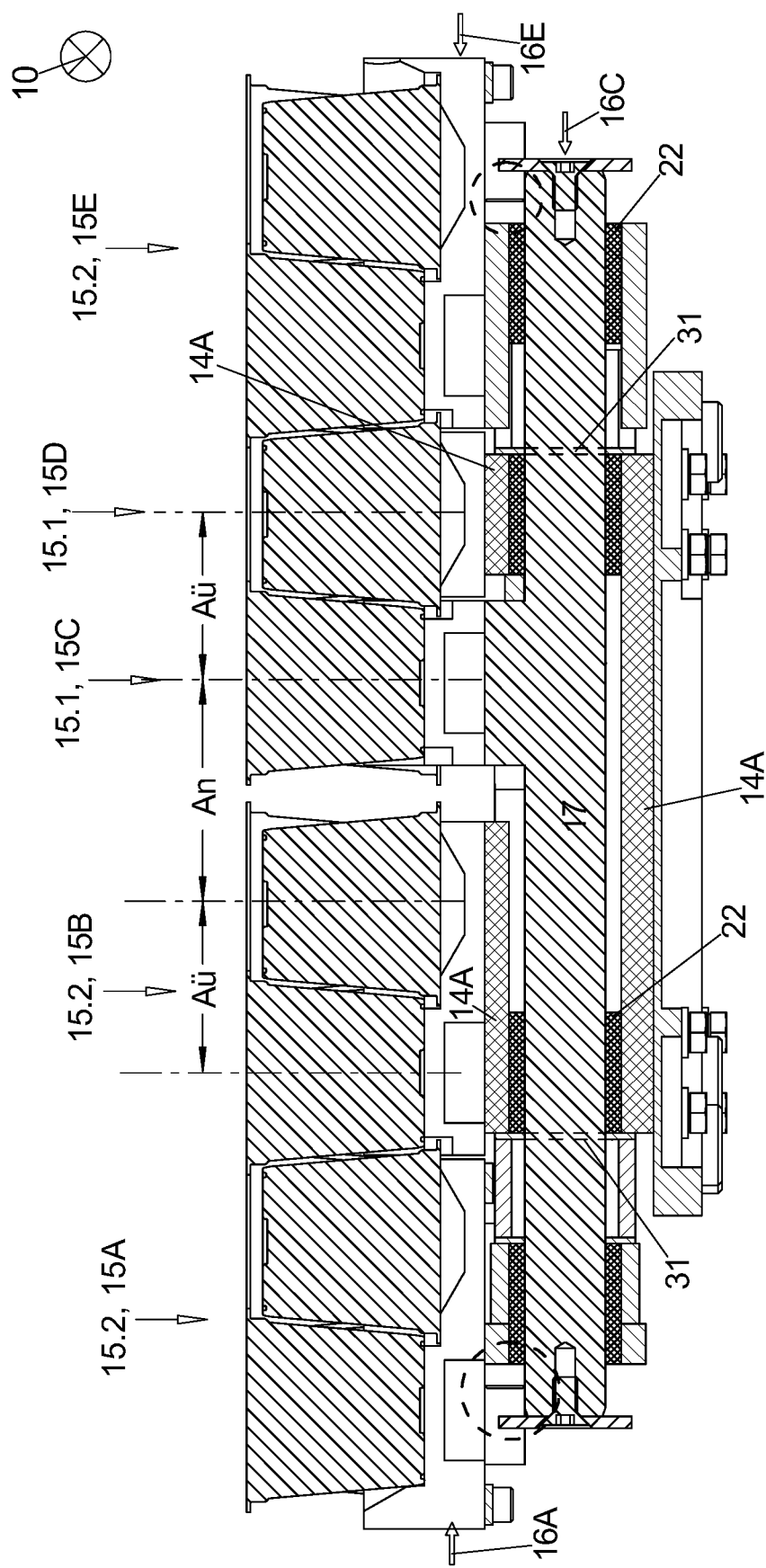
FIG. 4b: the spreading table of FIG. 3 viewed in longitudinal direction with twice each four rows in overlapping position, and distance between the rows of four in overlapping position to each other
Figure 4C:
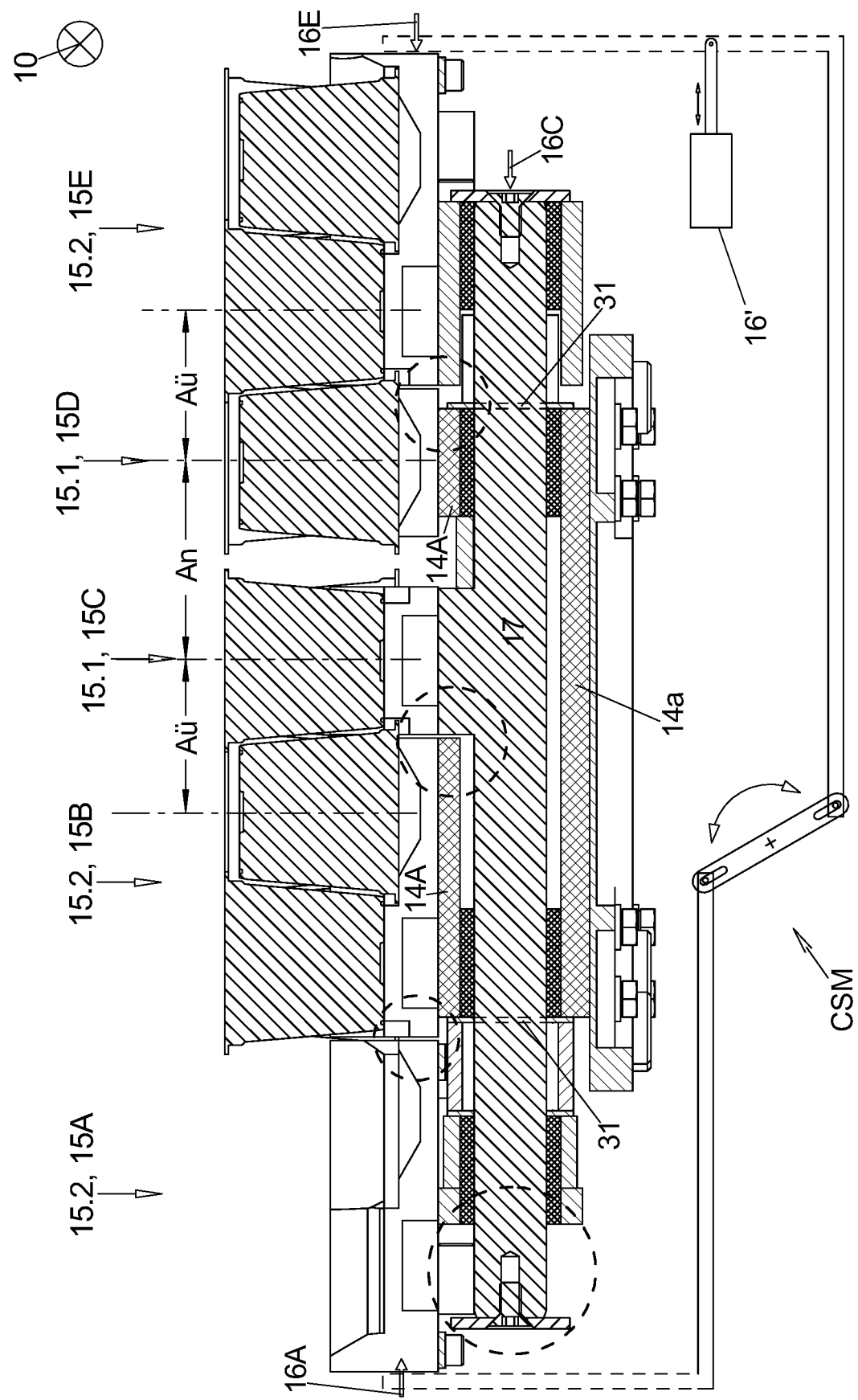
FIG. 4c: the spreading table of FIG. 3 viewed in longitudinal direction with twice three rows each in overlapping position, and distance between the rows of three in overlapping position to each other.

In the carton K and thus also shortly before being deposited therein, the same overlap as can be seen in FIG. 4c in the transverse direction 11 is preferably also present in the longitudinal direction 10, the change in the distances of the products P in the longitudinal direction 10 being effected by the discharge robot 24 and its tool W24 moving there.

Since the products P are generally always fed in the same orientation, here in normal orientation Pn, measures are necessary to achieve this alternating different orientation in longitudinal and transverse direction of the two-dimensional discharge set—which is taken from the spreading table and which can comprise several arrays to be discharged in a carton—both in longitudinal direction and in transverse direction.

Depending on the desired packaging, this should be possible in this case with two-row, three-row or four-row discharge sets and thus carton arrays.

A further complicating factor is that the carton arrays deposited in several layers one above the other in the cartons generally have complete layers in the lower layers, but should be able to have an incomplete layer in the top layer, for example.

First, rows of products P must be created, with a number of products per row equal to the number within the rows required on the spreading table. The number of products in a row here is 16, which is 1 less than the number of seats S within a row R of seats S of the spreading table 14.

Figure 3:
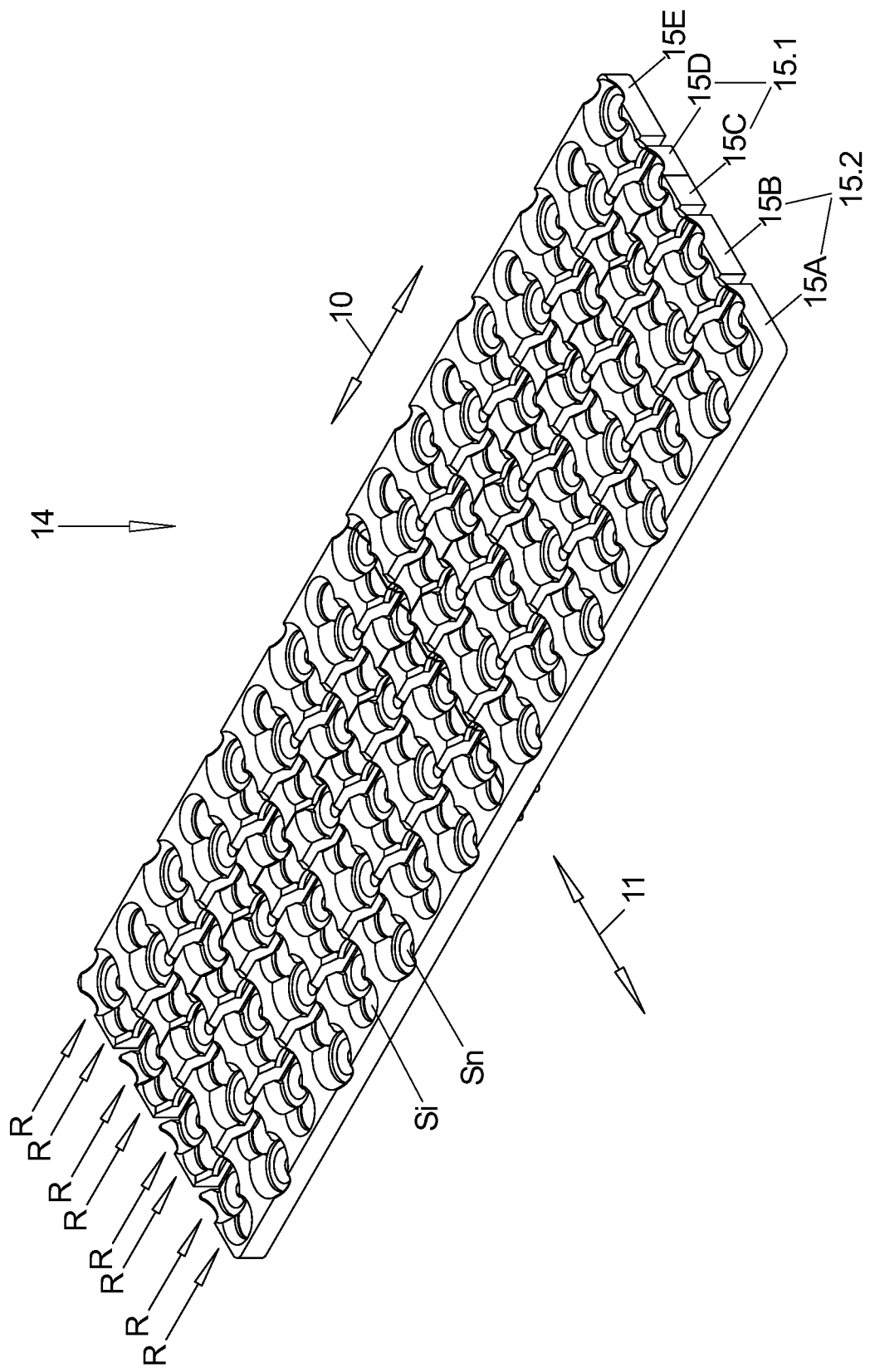
FIG. 3: a spreading table with longitudinal direction of rows of seats.

As can be seen in FIG. 3, the seats S are formed as recesses which are shaped differently depending on whether an inversely oriented product Pi or a normally oriented product Pn is to be received therein.

For this purpose, from each of the two arriving endless single-row queues of products Pn, in each of the two delivery areas 2, a row with a certain number, here 16 pieces, of products P is taken and held in front of it at a defined longitudinal distance from one another by a known grouping chain which, as seen in plan view, circulates over a deflecting roller on each side and from which the corresponding number of pushers 21 protrudes radially at a defined distance, here 16 pushers.

The first driver, which in FIG. 1a moves from the upper run shown in the drawing over the right deflecting roller into the lower run shown in the drawing, positively carries along the first product P of the delivered queue of products, whereupon the queue immediately slides along and the second driver carries along the product now at the front end, etc., until a total of 16 normally oriented products Pn are held at a defined longitudinal distance along the lower run shown in longitudinal direction 10 and in a defined position, and the grouping chain 20 stops.

The pushers 21 have such a height that the products can nevertheless be gripped from above and taken out upwards between the pushers 21.

To ensure that the group to be formed on the spreading table 14 has alternately oriented products, i.e., Pn once and Pi the next time, in each row R extending in the longitudinal direction 10 and in each column extending in the transverse direction 11 thereto, half of the products supplied in both product feed conveyors 25 with the same orientation, here Pn, must first be turned to the inverse orientation Pi.

Figure 2B:
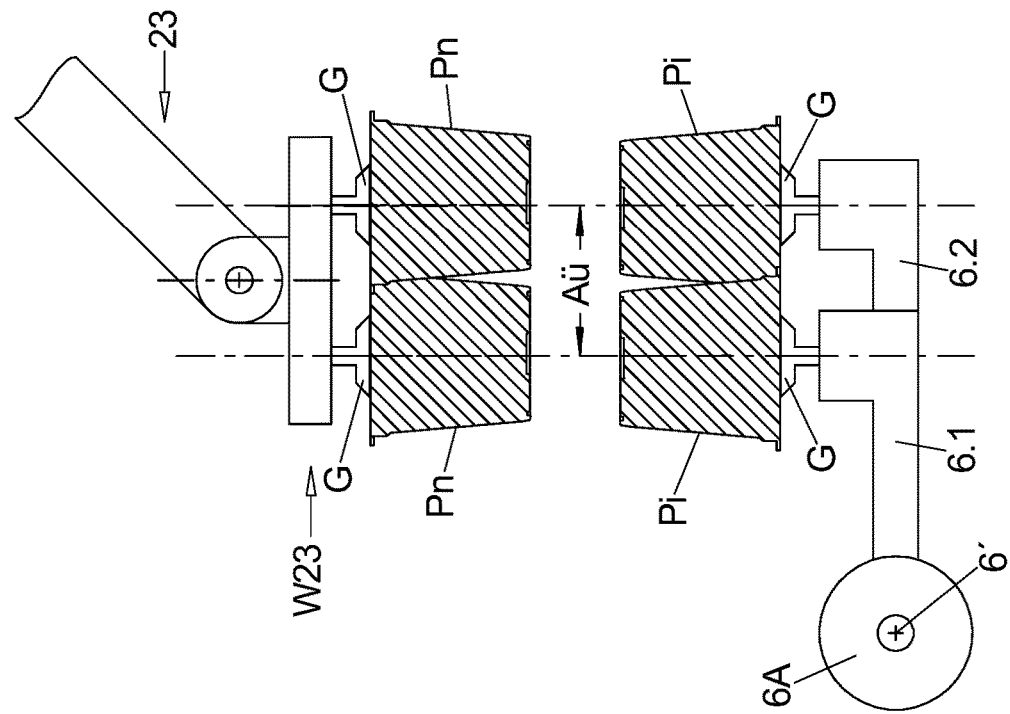
FIGS. 2a, b: the creation of the feed sets viewed in passage direction 10*.
FIGS. 2c-e: the creation of the feed sets viewed from above.
Figure 2A:
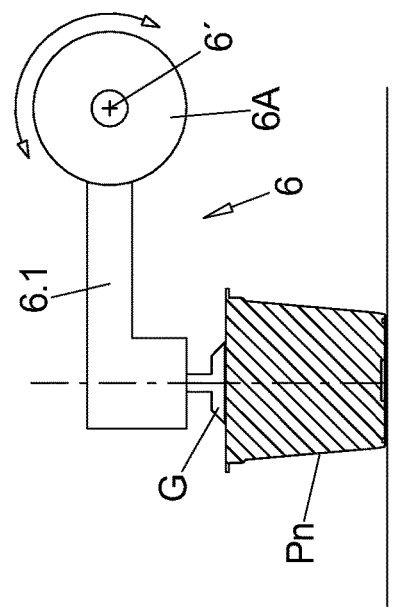

FIGS. 2a and 2c show a product flipper 6 with a bar-shaped base body 6A, along which, projecting to the same side at a distance from the products P held on the grouping chain 20, an analogous number, here 16, of gripper holders 6.1-6.16 are arranged, which in the gripping position each carry at their free end a downward-pointing gripper G, here a sucker G, which in the gripping position lies on a straight line.

The flipper 6 is positioned, and the gripper holders 6.1 to 6.16 are spaced apart from one another in the longitudinal direction 10, in such a way that, in this gripping position, it is seated with one gripper G each on a product P and can grip and hold the latter.

In addition, the base body 6A can be pivoted by about 180° about a pivot axis 6' extending in its longitudinal direction 10, so that after pivoting the grippers G point upwards and the product P held by them is located above the gripper G and in upside-down, inverse orientation Pi.

In addition, at least every second gripper holder, either the even-numbered or the odd-numbered ones, preferably every gripper holder, is automatically variable in its length under control in the same transverse direction to the pivot axis 6' by a distance corresponding to the distance between two rows R of seats S on the spreading table 14 located in overlapping position or overlapping distance AÜ from each other.

Thus, according to FIG. 2c, right side, the turned products Pi can be arranged on the corners of a zigzag line Z1.

The next row of 16 products Pn held by the grouping chain 20 is gripped by the tool W23 of a feeding robot 23 which—as shown in FIG. 2b, right side, and in FIG. 2d, far right side—carries sixteen pair holders 23.1 to 23.16 on its underside corresponding to the distance of the products of the group of 16 in the grouping chain 20. Each of the pair holders carries two grippers G on its underside spaced apart in the transverse direction 11 by the overlap distance AÜ.

The even-numbered or odd-numbered pair holders 23.1 to 23.16 can be moved in the transverse direction 11 by this overlap distance AÜ relative to the other, non-traversing gripper holders out of the mutually aligned position, and all pair holders 23.1 to 23.16 can also be moved by this overlap distance AÜ in the transverse direction 11.

The pair holders 23.1 to 23.16 are first brought into the non-aligned, offset position relative to one another, as in FIG. 2d, resulting in a straight line extending in the longitudinal direction 10 with 16 grippers G aligned thereon in the center, and a straight line with eight grippers G each thereon to the left and right thereof at the overlap distance AÜ.

In this state, the feeding robot 23 with its central line with 16 suckers lowers itself onto the row of 16 products Pn in the grouping chain 20, grips them and lifts them out of the grouping chain 20, and then displaces every second pair holder 23.1 to 23.16 back into alignment with each other, whereby the 16 products held by the tool W23, which are in the normal position Pn, are now positioned on the corners of a zigzag line Z2 as seen in plan view.

The flipper 6 on the one hand and the feeding robot 23 on the other hand are designed in such a way that the Z-lines Z1 and Z2 are in opposite directions, i.e., cross each other 15 times when lying on top of each other, or in other words, the pattern of Pi products held by the flipper 6 is complementary to the pattern of Pn products held by the feeding robot 23.

Accordingly, as shown in FIG. 2e, the feeding robot 23 with the Pn products held thereon is lowered onto the pattern of Pi products held by the flipper 6 in such a way that each of the still free grippers G of the feeding robot 23, one for each pair holder 23.1-23.16, grips one of the Pi products held by the flipper 6 on its upper side, whereupon the flipper 6 releases the hold products.

Thus, the feeding robot 23 now holds a feeding set consisting of two rows of 16 products each, arranged at an overlap distance AÜ in transverse direction 11, which alternate in longitudinal direction 10 with respect to their orientation, and also the two products arranged next to each other in transverse direction 11 are one a Pi product and one a Pn product.

If all gripper holders of the flipper 6 and/or all pair holders of the tool W23 are extendable or displaceable in transverse direction, the corresponding group with the respective second element must be controlled by the control in this respect in such a way that the two complementary patterns of products are formed.

As shown in FIGS. 1 and 1a, the spreading table 14 is loaded in the first feeding area 3 in the machine module 1a, but with two such feeding sets side by side, which are then shown here in the middle of the spreading table 14 on the slide 18.1, so that the process described must take place twice, i.e., the feeding robot 23 places such a feeding set twice in succession on this slide 18.1.

Each spreading table 14, however, has eight rows R of seats S corresponding to the product orientation to be picked up, also differentiated into seats for normally oriented products, i.e., Sn seats, and seats for inverted products to be placed, i.e., Si seats, indicated in FIG. 1a by a "+" for an empty Pi seat and a "−" for an empty Pn seat.

The slide e.g., 18.1 with the partially filled spreading table 14 on it then moves along its guide rail 19 to the right to the next feeding area 3, here in the machine module 1c, with the delivery area 2 ending there, and again grouping chain 20, product flipper 6 and feeding robot 23. The slide 18.1, as well as any other slides (e.g., slides 18.2 and 18.3), may move along the guide rail 19 in any suitable manner. For example, the guide rail 19 may include a toothed rack that extends along a length of the guide rail, and each slide 18.1, 18.2 and 18.3 may have a gear, which may be driven by a motor on the slide and which is engageable with the toothed rack for moving the slide along the guide rail 19. As another example, each slide 18.1, 18.2 and 18.3 may be moved along the guide rail 19 by any suitable actuator, such as an electric linear motor, a linear induction motor, or a linear reluctance motor.

Depending on how many completely or partially filled rows next to each other the spreading table 14 requires for its current work task, one or two further feeding sets are deposited on the spreading table 14 in this next feeding area 3 as previously described, in this case only one further double-row feeding set, as there on the slide 18.2 and its spreading table 14, because in this case cartons K are to be filled with layers of three rows each extending in longitudinal direction 10 next to each other, for which six rows of products P are required on the spreading table 14, while two rows of seats remain empty.

The slides 18.1-18.3, which carry the spreading tables 14 filled in accordance with the respective work order, are each moved on individually into the spreading area 4, here in the machine module 1d, in which a spreading station 7 is located next to and below the carriage rail 19, which spreading station 7 has the necessary at least one transverse drive 16, with which the transverse spacing of the rows of seats S on the spreading table 14 positioned in the spreading station can be changed in such a way that a discharge robot 24—which is not shown in FIGS. 1, 1a, 1b for reasons of clarity and is only shown in FIG. 4a—can remove a discharge set of products from the spreading table 14 in the discharge area 5 and transfer them, divided into several carton arrays, one behind the other in the longitudinal direction 10 into the cartons K, which are held for this purpose at the correct longitudinal distance from one another and at the correct longitudinal position relative to the spreading table 14 in the spreading area 4 on a container belt 30, usually stationary. Each transverse drive 16 may include any suitable drive member or device, such as an actuator (e.g., linear actuator).

Furthermore—which is of secondary importance for the embodiment described—on the side of the slide rail 19 facing away from the container belt 30 there runs a further slide rail 19* in the modules 1d and 1e, on which one or more buffer slides 18* can be moved in the longitudinal direction 10, which also have rows of seats extending in the longitudinal direction 10 several times next to one another with seats Si and Sn alternately inverted and normal in the row direction and column direction respectively and preferably with the same number of rows R and with the same number of seats S along a row as the spreading tables 14.

These buffering slides 18* are used to pick up products, a remaining group, left over when a spreading table 14 is emptied—converted by means of a buffering robot not shown at a different longitudinal position from the spreading area 4, here in module 1e—which may be left over if a layer—usually the top one—is to be deposited in the cartons K, which is to contain fewer products than the other layers.

Such a buffer slide 18* usually remains there until it is filled to the extent that it contains one or more carton arrays and is then moved to the left into discharge area 5, as shown in FIG. 1b, where—by means of the discharge robot 24, —it can discharge its contents partially or completely into empty cartons K provided there.

FIGS. 3 to 5 show how the rows R of seats S in the spreading area 4 in the spreading station 7 are brought to the correct transverse distance from one another by means of the one or more transverse drives 16.

FIG. 3 shows the spreading table 14 without the slide underneath it, on which it is generally firmly mounted and with which it can only move together in the longitudinal direction 10 along the slide rail 19, from which it can be seen on the one hand that the spreading table 14 has a total of eight rows lying next to one another in the longitudinal direction 10, in the longitudinal direction 10, where normal seats Sn for products Pn in the normal position alternate within the row R with inverted seats Si for inverted-oriented products Si, i.e., the seats formed as recesses are correspondingly dimensioned and positioned relative to one another.

Every second row R is the same, and the rows in between have an Sn seat at the positions where the first-mentioned rows have an Si seat, so that inverted seats Si also alternate with normal seats Sn in the transverse direction 11, which runs at right angles to the longitudinal direction 10.

FIG. 3 further shows that the rows R of seats are formed on strip-shaped support bars 15, here a total of five support bars 15A to 15E.

Starting from the left in the transverse direction 11, the support bars 15A, 15B and the last 15E each carry two rows R of seats at an overlap distance AÜ from one another, so that correspondingly oriented products placed in these seats overlap one another in the transverse direction 11 as viewed in plan. Between the double-row support bars 15B and 15E are two support bars 15C, D, each of which has only one row R of seats S.

FIGS. 4a to 4c show—viewed in longitudinal direction 10—the spreading table 14 with different distances of the support bars 15 in transverse direction 11 to each other, depending on how many rows the discharge set of products P to be transferred into the cartons K is to have and depending on the transverse distance of the rows of grippers G, which are present in the tool W24—which is usually also changed when the number of rows of the carton array is changed—of a discharge robot 24.

FIG. 4a shows the two-row or double-row support bars 15.2 in the form of the support bars 15A, B and E, that an overlap distance AÜ from the center of a normal seat Sn to the center of an inverse seat Si located next to it in the transverse direction 11, in particular in the same longitudinal position or in a longitudinal position slightly offset with respect thereto, is understood to be such a distance, that on the corresponding seat correspondingly oriented seated products Pn, Pi overlap each other in transverse direction 11, in that in this case the upper radially projecting rim of the Pn product projects over the bottom surface of the Pi product or at least its rim projecting radially there below and analogously vice versa.

On the other hand, non-overlap distance AN means that the transverse distance between adjacent seats Si and Sn is so large that products Pi, Pn located next to each other at this distance do not overlap in the horizontal and can be lifted upwards independently of each other.

FIG. 4a shows the initial spread condition:

Within the two-row support bars 15.2, in this case the support bars 15A, 15B and 15E, the two rows each extending in the viewing direction of FIG. 4a are already arranged at such an overlap distance AÜ. In addition, the two single-row support bars 15.1, in this case the support bars 15C and 15D, are moved so close together in transverse direction 11 that their seats and thus also correspondingly oriented products standing on them are located at the overlap distance AÜ.

The double-row support bar 15B and the single-row support bar 15D are fixed in the transverse direction 11 to the base body 14A of the spreading table 14, which contains sleeve-shaped bearings 22, mostly plain bearings 22, aligned in the transverse direction 11 at two longitudinal positions in each case, in which bearings a guide rod 17 extends transversely through the base body 14A in the front and rear end region in the longitudinal direction 10 and projects from the base body 14A on both sides.

The single-row support bar 15C is fixed to this guide bar 17 in the transverse direction and is thus a direct bar 15d, since it can be displaced directly relative to the base body 14A.

The two outer, double-row support bars 15A, 15E are displaceably arranged on this guide rod 17 and held at a distance from the next inner, adjacent support bar 15B or 15D by means of a compression spring 31 and pressed against a transverse stop at the respective outer end of the guide rod 17. They are thus indirect support bars 15ind, since they can be displaced directly only with respect to the guide rod 17 and thus only indirectly with respect to the base body 14A. The springs 31 additionally press the single-row strip 15C and the adjacent single-row strip 15D against each other.

Thus, when two-row sets of products P are to be removed from the spreading table 14 and transferred into cartons, the spreading table 14 can remain in the unloaded initial position as shown in FIG. 4a and all eight rows can be filled with products.

If, as shown in FIG. 4b, four-row discharge sets of products P, overlapping in the transverse direction within each of the four rows, are required for transfer into cartons K, all eight rows can be likewise be occupied with products P.

Before discharge, the transverse drive 16A then displaces the double-row support bar 15A and the transverse drive 16E displaces the double-row support bar 15E toward each other against the force of the springs 31 until the first four rows of seats S and the last four rows in the transverse direction are each at an overlap distance AÜ from each other, the fourth and fifth rows of seats and products P resting thereon, on the other hand, are at a non-overlap distance An, so that the four-row feed sets of products can be lifted up and transferred independently of each other.

Since the support bars 15B and 15D are fixed to the base body 14A in the transverse direction, they serve as stops when the outer support bars 15A, 15E are pushed towards them.

If, on the other hand, three-row discharge sets of products P are to be produced according to FIG. 4c, it is clear on the one hand that because of eight rows in total only two three-row discharge sets can be produced, i.e., two rows of seats cannot contribute to these three-row discharge sets and preferably remain empty, in this case the outer support bar 15A of the two adjacent double-row support bars 15A and 15B.

Furthermore, it is clear that a non-overlap distance AN must be obtained between the seats and products standing thereon of the two single-row support bars 15C, 15D.

This is achieved by pressing the outer double-row support bar 15E against the base body-fixed single-row support bar 15D to an overlap distance AÜ, in particular until these support bars are in contact with each other, by means of the transverse drive 16E, and by pressing the support bar 15A against the base body-fixed double-row support bar 15B as a counter support.

This is necessary so that the bar-fixed, single-row support bar 15C is pressed away from the position in which it is in the starting position on the support bar 15D and up to an overlap distance AÜ against the adjacent double-row base-body-fixed support bar 15B by subsequent action by means of the drive 16C, which does not act on the respective support bar but on the guide bar 17.

The three-row discharge sets can then be removed individually and transferred to the cartons.

FIG. 5 shows the spreading station 7 with the transverse drives 16:

The transverse drives 16A and 16E are arranged at a height such that, with a slide 18 with spreading table 14 thereon located therebetween in the spreading station 7, they press against the outside of the support bars 15A and 15E, respectively.

The two transverse drives 16C, which in this case are spaced apart in the longitudinal direction 10 and are arranged on the same side of the carriage rail 19, are arranged at such a height and at such a longitudinal position that they press against the end face of one of the two guide rods 17 of the spreading table 14 standing in the spreading position, i.e., at the correct longitudinal position in the spreading station 7, and which of course must be actuated synchronously.

These transverse drives 16C are arranged on the side such that they push the respective guide rod 17 away from the base body-fixed single-row support bar 15D in the direction of the two adjacent double-row support bars 15A and 15B.

Of course, the two transverse drives 16C could be combined into a single one acting on an indicated connecting rod between the two sliding pins, each of which presses on one of the two guide rods 17.

The transverse drives are preferably arranged on two beams extending on both sides of the rail 19, which are rigidly connected to the machine frame not shown here.'

Returning to FIG. 4c, an alternative drive arrangement is also shown for moving one or more of the support bars 15A-15E in a transverse direction. That arrangement includes a single or common drive 16', such as a transverse drive, and a counter-synchronous mechanism CSM, such as a linkage assembly or lever assembly, that cooperates with the common drive to move the two outer double-row support bars 15A and 15E toward or away from each other in a counter-synchronous manner. In the illustrated embodiment, the CSM includes a lever, e.g, two-arm lever having two arms of equal length, that is pivotable about an axis. For example, the lever may be pivotally mounted to a frame of the spreading station 7. The CSM further includes first and second links (e.g., cranked pushers) movably connected to opposite ends of the lever, such as with pin and slot connections. The links also have distal portions that extend in the same direction, such as upright limbs shown with dashed lines, and that are engageable with parts or components to be moved. In the illustrated embodiment, the first link has a distal portion that is engageable with an outer side (e.g., left side) of the double-row support bar 15A, and the second link has a distal portion that is engageable with an outer side (e.g., right side) of the double-row support bar 15E. The common drive 16' may be connected to the counter-synchronous mechanism CSM at any suitable location (e.g., to one of the distal portions or limbs of one of the links), and may be actuated or operated to move the double-row support bars 15A and 15E toward or away from each other. In another embodiment, the common drive 16' may be attached to the lever and configured to rotate the lever.

FIG. 1b further shows that within the rows of seats S extending in longitudinal direction 10 and thus also the products Pi, Pa resting thereon do not have an overlap distance AÜ in longitudinal direction 10 to each other, but the products in the already filled cartons K do.

With regard to the mobility of its grippers G, in particular suckers G, on the base body of the tool, the discharge robot 24 is designed in such a way that it can automatically move the groups of e.g., three grippers or suckers G, which are adjacent in the transverse direction 11, the column direction, in the longitudinal direction 10 relative to the base body and relative to each other over a wide range in a controlled manner. As a result, during the transfer process from the spreading table 14 to the cartons K, on the one hand, in each case e.g., four groups of three in longitudinal direction 10 to overlap distance AÜ in longitudinal direction 10, and these three on four large carton arrays to a longitudinal position, which corresponds to the longitudinal position of the provided cartons K, in particular on the container belt 30, so that the discharge robot 24 can divide in each case a discharge set, in longitudinal direction 10 into three times four products large carton arrays and deposit one of these in each case in a carton K on the container belt 30.

In another embodiment of a spreading table according to the disclosure, the double-row support bar 15A shown in FIG. 4a could instead be positioned on the right side of double-row support bar 15E. With such a configuration, the spreading table would have a package in the middle or middle portion comprising two single-row support bars 15C and 15D and the double-row support bar 15E, and at each of the right and left sides of that package there would be one double-row support bar (e.g., double-row support bar 15B on the left side, and double-row support bar 15A on the right side).

REFERENCE LIST 1a, b machine frame, frame module
2 delivery area
3 feeding area
4 spreading area
5 discharge area
6 flipper
6.1-6.18 pair holder
6' pivot axis
6A base body
7 spreading station
8 transport device
9 safety door
10 longitudinal direction of rows,
10* main transport direction
11 horizontal transverse direction to 10
11* horizontal transverse direction to 10*
12 vertical
13 grouping device
14 spreading table
14A base body
15 support bar
15A-E support bar
15.1 single-row support bar
15.2 double-row support bar
15d direct bar
15ind indirect bar
16 transverse drive
17 guide rod
18.1/2/3 slide
19 slide rail
20 grouping chain
21 pusher
22 bearing, sliding bearing
23 feeding robot
W23 tool
23.1-23.16 pair holder
24 discharge robot
W24 tool
25 product feeding conveyor
26 erecting station
27 blank magazine
28 closing station 29 carton discharge conveyor
30 container conveyor
31 pressure spring
CSM counter-synchronous mechanism
G gripper, sucker
K outer package, carton
P product
Pn product in normal position, product in initial position
Pi product in inverse position, flipped product, differently oriented product
R row
S seat
Sn seat for product in normal position, product in initial position
Si seat for product in inverse position, flipped product, differently oriented product

What is claimed is:

1. A packaging machine with a grouping device comprising:
   a spreading area with a spreading table with a base body and a plurality of support bars adjustable in their transverse spacing, each having at least one row of seats extending in a longitudinal direction, each of the seats for one product,
   at least one transverse drive for adjusting the transverse spacing, for producing a single-layer group having an even or uneven number of rows of products, the products within the group partially overlapping one another as viewed in plan in a transverse direction, and for inserting the group into an outer package,
wherein the packaging machine further comprises
   a delivery area in which the products are deliverable,
   a feeding area comprising a feeding robot for transferring a feeding set of products from the delivery area to the spreading table,
   a discharge area with a discharge robot for transferring a discharge set of products away from the spreading table directly or indirectly into the outer package,
wherein
   the plurality of support bars comprise a plurality of double-row support bars and two single-row support bars between two of the double-row support bars, each double-row support bar having two rows of seats which cannot be moved relative to one another in the transverse direction, and each of the
   two single-row support bars being movable relative to one another in the transverse direction, and
   the at least one transverse drive is capable of bringing the two single-row support bars selectively towards one another, or away from one another towards the two of the double-row support bars.

2. The packaging machine according to claim 1, wherein
at least two of the support bars of the spreading table, but no support bars directly adjacent to each other, are fixedly connected in the transverse direction to the base body of the spreading table,
the remaining support bars
   either are each displaceable transversely as direct bars directly relative to the base body,
   or at least one support bar is a direct bar that is transversely displaceable directly relative to the base body, and the remaining support bars are indirectly displaceable relative to the base body as non-transversely fixed indirect bars by being transversely displaceable directly relative to the at least one direct bar.

3. The packaging machine according to claim 2, wherein the indirect bars are outermost support bars of the spreading table.

4. The packaging machine according to claim 2, wherein
   at least one guide rod extends from the at least one direct bar in the transverse direction on at least one side,
   at least one indirect bar is positively guidable along the at least one guide rod.

5. The packaging machine according to claim 1, wherein
   a double-row support bar of the two of the double-row support bars is arranged immediately adjacent to one of the two single-row support bars,
   the double-row support bar and the other of the two single-row support bars facing away therefrom are fixed transversely to the base body,
   another double-row support bar of the plurality of double-row support bars is arranged on an outside adjacent to each of the two transversely fixed support bars, to provide two outer double-row support bars,
   in an initial state, the two single-row support bars contact one another but are at an initial distance from the adjacent double-row support bars.

6. The packaging machine according to claim 5, wherein the one of the two single-row support bars is a non-transversely fixed single-row support bar.

7. The packaging machine according to claim 6, wherein
   the non-transversely fixed single-row support bar is movable in the transverse direction by a controlled transverse drive of the at least one transverse drive,
   either the two outer double-row support bars can be moved in the transverse direction by a separate transverse drive of the at least one transverse drive in each case,
   or the two outer double-row support bars can be moved in opposite synchronism in the transverse direction by a common transverse drive of the at least one transverse drive and a counter-synchronous mechanism.

8. The packaging machine according to claim 1, wherein
   a double-row support bar of the two of the double-row support bars is arranged immediately adjacent to one of the two single-row support bars, and the double-row support bar and the two single-row support bars form a package, another double-row support bar of the plurality of double-row support bars is arranged on an outside adjacent to this package on each side of the package,
   in an initial state, the two single-row support bars contact one another, but have an initial distance from the adjacent double-row support bars.

9. The packaging machine according to claim 8, wherein
   the two single-row support bars can be moved in opposite synchronism in the transverse direction by means of a controlled first transverse drive of the at least one transverse drive and a counter-synchronous mechanism,
   the double-row support bar on the one hand and the two single-row support bars together on the other hand can be displaced counter-synchronously in the transverse direction by means of a controlled second transverse drive of the at least one transverse drive and a counter-synchronous mechanism.

10. The packaging machine according to claim 1, wherein the products within the group are oriented alternately in the longitudinal direction and/or in the transverse direction, wherein
   the feeding area comprises a product flipper with a number of grippers, which can be adjusted between a first operating position arranged in only one row and a second operating position arranged in two rows of grippers, and can be pivoted about a horizontal pivot axis and/or the feeding robot has a tool with at least one row of grippers for holding one product each.

11. The packaging machine according to claim 1, wherein a plurality of spreading tables are provided which are movable independently of one another, the at least one transverse drive is arranged in one spreading station to which the loaded spreading tables can be moved.

12. The packaging machine according to claim 11, wherein each spreading table is movable by means of a transport device, and the transport device comprises slides which can be moved along a guide.

13. The packaging machine according to claim 11, wherein a plurality of delivery areas and feeding areas are provided, in each of which a spreading table can be loaded only partially or completely.

14. The packaging machine according to claim 1, wherein the feeding robot comprises a tool, multiple pair holders carried by the tool, and multiple grippers carried by the pair holders, wherein one pair of two grippers adjacent in the transverse direction is fixed to each pair holder, and the pair holders are movable in transverse direction between a first functional position and a second functional position.

15. The packaging machine according to claim 14, wherein the tool of the feeding robot is movable between a first functional position, in which the grippers are arranged in two rows of grippers extending in the longitudinal direction, and a second functional position, in which the grippers are arranged in three rows of grippers.

16. The packaging machine according to claim 1, wherein the discharge robot comprises a tool having a plurality of rows of grippers, and the grippers adjacent in the transverse direction and arranged approximately at a same longitudinal position along the rows are fastened as a transverse group to a transverse group holder, and the holders are movable in the longitudinal direction between at least a first, more widely spaced, functional position and a second, more closely spaced or contacting, functional position.

17. The packaging machine according to claim 1, wherein a buffer is provided for products remaining on the spreading table after the outer package has been filled from the spreading table, the buffer includes rows of seats extending in the longitudinal direction on a buffer slide, and the buffer slide can be moved along a buffer rail and can approach a longitudinal position of a spreading station in a passage direction at such a transverse distance from the discharge robot that the latter can remove products from the buffer slide with its tool and transfer them into cartons.

18. A packaging machine comprising:

a grouping device comprising a spreading table and a plurality of support bars arranged on the spreading table that each have at least one row of seats extending in a longitudinal direction, each of the seats for one product, wherein the support bars are adjustable in their traverse spacing for producing a single-layer group having an even or uneven number of rows of products, the products within the group partially overlapping one another as viewed in plan view in a transverse direction, and for inserting the group into an outer package;

wherein the plurality of support bars comprise two double-row support bars and two single-row support bars arranged between the two double-row support bars, wherein the two single-row support bars are movable back and forth between a first position next to one another for formation of a group with an even number of rows, and a second position further apart which each of the two single-row support bars is closely adjacent to a respective one of the two double-row support bars for forming a group with an odd number of rows.

* * * * *

UNITED STATES PATENT AND TRADEMARK OFFICE
CERTIFICATE OF CORRECTION

PATENT NO. : 12,129,062 B2
APPLICATION NO. : 17/869694
DATED : October 29, 2024
INVENTOR(S) : Sebastian Brand Page 1 of 1

It is certified that error appears in the above-identified patent and that said Letters Patent is hereby corrected as shown below:

In the Claims

Column 22, Line 39, Claim 18:
After "a second position further apart"
Insert -- in --

Signed and Sealed this
Twenty-fourth Day of June, 2025

Coke Morgan Stewart
*Acting Director of the United States Patent and Trademark Office*